(12) United States Patent
Andrews et al.

(10) Patent No.: US 10,098,291 B2
(45) Date of Patent: Oct. 16, 2018

(54) SYSTEM AND METHOD FOR REMOTE OVERIDE OF ALIGNMENT FAULT FOR PIVOT IRRIGATION SYSTEMS

(71) Applicant: LINDSAY CORPORATION, Omaha, NE (US)

(72) Inventors: Reece Robert Andrews, Arlington, NE (US); Daniel James Pickerill, Milford, NE (US)

(73) Assignee: LINDSAY CORPORATION, Omaha, NE (US)

( * ) Notice: Subject to any disclaimer, the term of this patent is extended or adjusted under 35 U.S.C. 154(b) by 408 days.

(21) Appl. No.: 14/966,592

(22) Filed: Dec. 11, 2015

(65) Prior Publication Data

US 2017/0164569 A1    Jun. 15, 2017

(51) Int. Cl.
*A01G 25/09* (2006.01)
*A01G 25/16* (2006.01)
*G05B 15/02* (2006.01)

(52) U.S. Cl.
CPC .......... *A01G 25/092* (2013.01); *A01G 25/16* (2013.01); *G05B 15/02* (2013.01)

(58) Field of Classification Search
None
See application file for complete search history.

(56) References Cited

U.S. PATENT DOCUMENTS

| | | | |
|---|---|---|---|
| 4,073,309 A | 2/1978 | Fraser et al. | |
| 5,927,603 A | 7/1999 | McNabb | |
| 7,558,650 B2 * | 7/2009 | Thornton | A01G 25/16 700/284 |
| 8,930,032 B2 * | 1/2015 | Shupe | A01G 25/16 239/11 |
| 9,244,449 B2 * | 1/2016 | Tennyson | G05B 19/02 |
| 2004/0194833 A1 * | 10/2004 | Townsend | A01G 25/16 137/624.11 |
| 2004/0252034 A1 * | 12/2004 | Slemmer | G08G 1/14 340/932.2 |
| 2005/0107924 A1 * | 5/2005 | Bailey | A01G 25/16 700/284 |

(Continued)

FOREIGN PATENT DOCUMENTS

WO    WO03081362 A1    10/2003

*Primary Examiner* — Michael Lebentritt
(74) *Attorney, Agent, or Firm* — Hovey Williams LLP

(57) ABSTRACT

A system and method for overriding an alignment circuit of an electric center pivot irrigation system. The system may include a local controller wired to the alignment circuit and a remote control wirelessly communicating with the local controller. The remote control may receive an alignment fault alert from the local controller indicating that the alignment circuit has switched to the open circuit configuration. Next, the remote control may send an auto-alignment signal to the local controller. The auto-alignment signal may instruct the local controller to command a relay to switch to a bypass mode. In the bypass mode, signals between the local controller and operational elements of the electric center pivot irrigation system bypass the alignment circuit. The auto-alignment circuit may also command the operational elements to reverse travel directions of the electric center pivot irrigation system simultaneously while the alignment circuit is bypassed.

20 Claims, 5 Drawing Sheets

(56) References Cited

U.S. PATENT DOCUMENTS

2013/0048747 A1* 2/2013 Pfrenger .............. A01G 25/092
  239/1
2014/0039696 A1* 2/2014 Andrews ................ A01G 25/16
  700/284

* cited by examiner

SYSTEM AND METHOD FOR REMOTE OVERIDE OF ALIGNMENT FAULT FOR PIVOT IRRIGATION SYSTEMS

BACKGROUND

Center pivot irrigation systems generally include a plurality of spans supported by a plurality of towers which travel in a circle about a pivot point while water is distributed to crops through various passageways, nozzles, and sprinkler heads supported by the towers and/or the spans.

Electric center pivot irrigation systems typically have main control panels at their pivots. A lack of standardization of these controls across different manufacturers makes it difficult for many users to program and control their irrigation systems, sometimes leading to costly mistakes, such as over- or under-watering.

Remote controls can simplify the operations of center pivot irrigation systems, but many irrigation systems do not include original remote controls. When remote controls are desired, one solution is to entirely replace the original control systems, but this can be prohibitively expensive. Another solution is to install after-market remote controls, but this can pose other problems. After-market remote controls are often installed on the opposite ends of the pivot from the original local controls, but some functions, such as alignment override of a safety circuit or alignment circuit after an alignment fault is experienced must still be performed at the main control panel located at the center pivot. Thus, these after-market remote controls typically provide limited control functionality.

An alignment fault may occur when one of the center pivot irrigation system's towers is not moving, such as if one of the towers is stuck in the mud, or experiencing a drivetrain or mechanical failure. To get the irrigation system back into alignment, the user typically must reverse the direction of at least one of the towers until the misaligned tower is back into a relatively straight line with the other towers. Then the irrigation system may attempt travel in the original forward direction again.

The safety circuit or alignment circuit of the of the center pivot irrigation system is generally designed to switch from a closed circuit configuration to an open circuit configuration when the irrigation system experiences an alignment fault condition. Once the safety circuit or alignment circuit is in the open circuit configuration, manual action at the main control panel is required to move the irrigation system towers in either direction. Specifically, an operator may be required to hold both an alignment override button on the main control panel and a direction button for the desired direction (such as reverse). As the user presses and holds these two buttons, electrical signal temporarily bypasses the safety circuit to allow the towers to move until they get back into normal alignment and the safety circuit closes or returns to the closed circuit configuration.

This manual override requires a user to first confirm that one of the towers of the irrigation system is stuck by walking around and visually inspecting the towers to find the reason for the alignment fault, and then to walk back to the pivot point where the main control panel is located to commence with the override operations. This can be time-consuming and inconvenient for the user.

This background discussion is intended to provide information related to the present invention which is not necessarily prior art.

SUMMARY

Embodiments of the present invention solve the above-described and other problems and limitations by providing a system and method for retrofitting an existing electric center pivot irrigation system to have both a standardized local control and a functionally integrated remote control that allows for remote override of a safety circuit or alignment circuit.

An embodiment of a method for overriding the safety circuit or alignment circuit of an electric center pivot irrigation system may include a step of receiving with a remote control an alignment fault alert from a local controller at a pivot point of the irrigation system. This alignment fault alert may be provided via a remote communication element associated with the local controller and may indicate that the alignment circuit has switched to the open circuit configuration. Next, the method may include a step of sending an auto-alignment signal from the remote control to the local controller, via the remote communication element. The auto-alignment signal may instruct the local controller to command a relay to switch to a bypass mode in which signals between the local controller and operational elements of the electric center pivot irrigation system bypass the alignment circuit. The auto-alignment signal may also command the operational elements to reverse travel directions of the electric center pivot irrigation system, in an attempt to realign the misaligned towers of the electric center pivot irrigation system.

Some embodiments of the invention include a physical, non-transitory computer readable medium with a computer program stored thereon for controlling an electric center pivot irrigation system. The electrical center irritation pivot may have a plurality of towers attached to each other by a plurality of spans and may be controlled by a control system including a local controller, a remote communication element, operational elements controlling a plurality of operations, an alignment circuit electrically coupling the operational elements and the local controller, and a relay. The alignment circuit may switch to an open circuit configuration when one or more of the towers are out of alignment and switch to a closed circuit configuration when all of the towers are back in alignment with each other. The computer program may include a code segment for receiving an alignment fault alert from the local controller indicating that the alignment circuit has switched to the open circuit configuration, and a code segment for sending an auto-alignment signal to the local controller. The auto-alignment signal may instruct the local controller to command the relay to switch to a bypass mode in which signals between the operational elements and the local controller bypass the alignment circuit. The auto-alignment signal may also command the operational elements to reverse travel directions of the electric center pivot irrigation system.

Another embodiment of the invention may include a system for controlling an electric center pivot irrigation system having a plurality of towers attached to each other by a plurality of spans. The electric center pivot irrigation system includes an original control system having an original control logic, operational elements controlling a plurality of operations, and an alignment circuit. The alignment circuit switches to an open circuit configuration when one or more of the towers are out of alignment and switches to a closed circuit configuration when all of the towers are back in alignment with each other. The system may include a local controller, a user interface, a remote communication element, and a relay.

The local controller may be installed at a pivoting point of the electric center pivot irrigation system, may be communicably coupled with the operational elements of the electric center pivot irrigation system, and may bypass the original control logic of the original control system. The user interface may be communicably coupled with the local controller, may receive selections from a user, and communicate the selections to the local controller. The remote communication element may receive data from a remote control according to selections made by the user remotely controlling the plurality of operations of the electric center pivot irrigation system. The remote communication element may be installed at the pivoting point of the electric center pivot irrigation system and may be functionally integrated with the local controller such that a change made via the remote communication element is reflected in the local controller. The relay may electrically couple the alignment circuit with the local controller and/or the operational elements.

The local controller may, in response to detecting that the alignment circuit has switched to the open circuit configuration, send an alignment fault alert to the remote control via the remote communication element. The relay may switch to a bypass mode in which signals between the operational elements and the local controller bypass the alignment circuit based on auto-alignment signals received from the user interface and/or the local controller. The local controller may also command the operational elements to reverse travel directions of the electric center pivot irrigation system when the auto-alignment signal is received. The local controller switches the relay to bypass the alignment circuit for a threshold number of occurrences and/or a threshold amount of time.

This summary is not intended to identify essential features of the present invention, and is not intended to be used to limit the scope of the claims. These and other aspects of the present invention are described below in greater detail.

DESCRIPTION OF THE DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Figure 1:
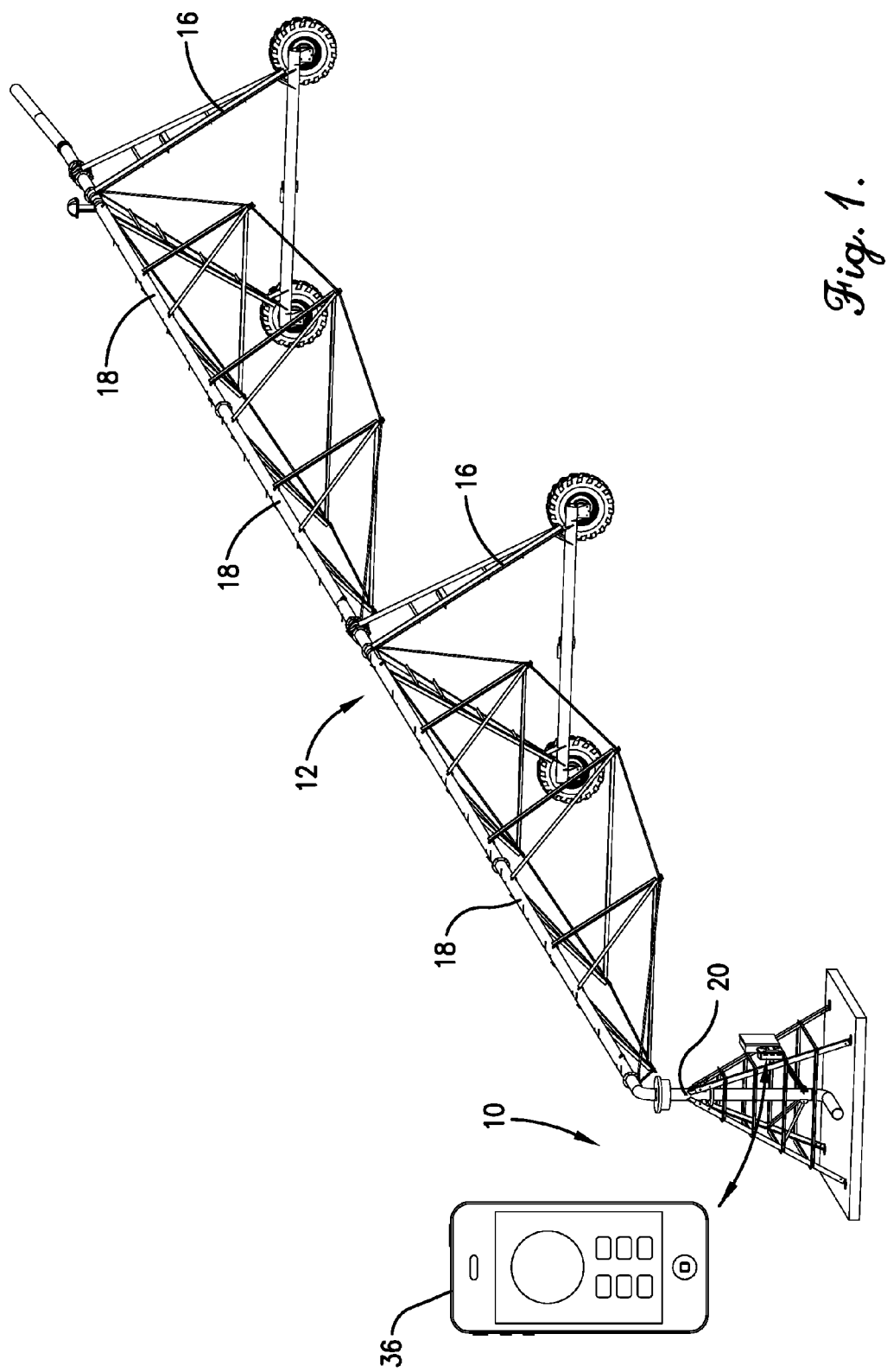
FIG. 1 is a perspective view of a system, constructed in accordance with embodiments of the present invention, for remotely and locally overriding an alignment circuit of on an electric center pivot irrigation system.
Figure 2:
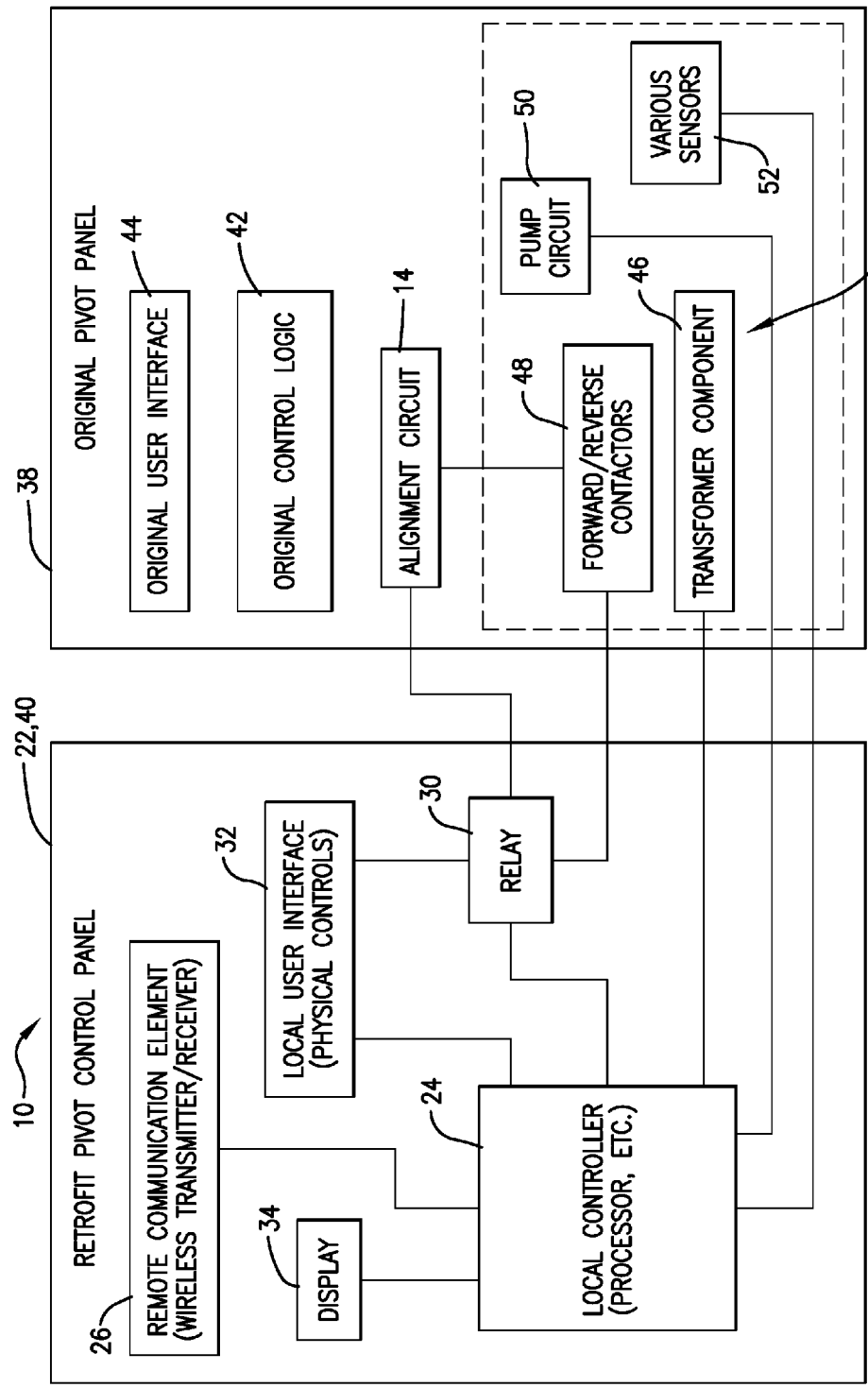
FIG. 2 is a block diagram of elements of the system of FIG. 1.

Referring to FIGS. 1 and 2, the present invention broadly provides a system 10 and method 500 for remotely and locally overriding an alignment circuit 14 of an electric center pivot irrigation system 12. The electric center pivot irrigation system 12 may comprise a plurality of towers 16 connected by a plurality of spans 18 and may be cooperatively rotatable about a pivot point 20, as illustrated in FIG. 1. The system 10 may be configured to control and/or monitor the system 12. Specifically, the system 10 may comprise at least one housing 22 mounted at the pivot point 20, with the following components stored on or in the housing 22: a local controller 24, a remote communication element 26, operational elements 28 controlling a plurality of operations, the alignment circuit 14, a relay 30, a user interface 32, and one or more display elements 34. In some embodiments of the invention, the system 10 may further include a remote control 36 located remotely from the housing 22 and communicably coupled to various components in the housing 22 via the remote communication element 26.

The housing 22 may be any substantially weather-resistant container mountable to any portion of the electric center pivot irrigation system 12, such as one of the towers 16 at the pivot point 20 thereof. The housing 22 may have various access ports for allowing wires and cables to extend therethrough, as well as one or more openable segments such that a user or service personnel can access the components housed inside of the housing 22 for upgrades, troubleshooting, and/or repairs. In some embodiments of the invention, the housing 22 may include both an original pivot control panel 38 (e.g., an OEM control panel) and a retrofit pivot control panel 40 fixed to or near each other at the pivot point 20, with components therein electrically and/or communicably coupled together, as illustrated in FIG. 2.

The local controller 24 may include any number of a processor, integrated circuits, programmable logic devices or other computing devices, and resident or external memory for monitoring and controlling various operations of the system 12. For example, the memory may store executable code segments, computer programs, operational data, threshold values, and/or other data accessed and/or generated by the processor of the local controller. The local controller may also include and/or be coupled, via wired or wireless communication connections, with the user interface, the display elements, the operational elements, the alignment circuit, the relay, I/O ports, and other standard computer processor components known in the art.

In some embodiments of the invention, the local controller 24 may comprise the original control logic components 42 located in the original pivot control panel 38 of the system 12, and the user interface 32 may comprise an original user interface 44. In other alternative embodiments of the invention, as illustrated in FIG. 2, the local controller 24 may be located on the retrofit pivot control panel 40 and may be wired to the alignment circuit 14 and operational elements 28 located in the original pivot control panel 38, bypassing the original control logic components 42. One example of how a local controller may be used to bypass original pivot control panel elements may be found in U.S. patent application Ser. No. 14/839,547, filed Aug. 28, 2015, hereby incorporated by reference herein in its entirety.

The local controller 24 may have a computer program, algorithms, and/or code segments stored thereon or accessible thereby for performing the method steps described herein. The computer program preferably comprises an ordered listing of executable instructions for implementing logical functions in the local controller. The computer program can be embodied in any computer-readable medium for use by or in connection with an instruction execution system, apparatus, or device, and execute the instructions. In the context of this application, a "computer-readable medium" can be any system and/or device that can contain, store, communicate, propagate, or transport the program for use by or in connection with an instruction execution system, apparatus, or device. The computer-readable medium can be, for example, but not limited to, an electronic, magnetic, optical, electromagnetic, infrared, or semiconductor system, apparatus or device. More specific, although not inclusive, examples of the computer-readable medium would include the following: an electrical connection having one or more wires, data storage devices such as hard disk drives or solid-state drives, a portable computer diskette, a random access memory (RAM), a read-only memory (ROM), an erasable, programmable, read-only memory (EPROM or Flash memory), an optical fiber, and a portable compact disk read-only memory (CDROM).

The memory of the local controller 24 may include, for example, removable and non-removable memory elements such as RAM, ROM, flash, magnetic, optical, USB memory devices, and/or other conventional memory elements. The memory may store various data associated with the system 10, such as the computer program and code segments mentioned above, or other data for instructing the local controller 24 to perform the steps described herein. Further, the memory may store data retrieved from the remote control 36 via the remote communication element 26, as well as data received from any of the operational elements 28, the alignment circuit 14, the relay 30, and/or the user interface.

The I/O ports of the local controller 24 may permit data and other information to be transferred to and from the local controller 24. The I/O ports may include a TransFlash card slot for receiving removable TransFlash cards, a USB port for coupling with a USB cable connected to another component of the system 10, a SCSI port for coupling with one or more SCSI cables connected to another component of the system 10, and/or a fiber optic port coupling with one or more fiber optic cables connected to another component of the system 10.

The remote communication element 26 may comprise any wireless communication device such as a receiver, transmitter, transceiver, antenna, and the like. Specifically, the remote communication element 26 may be configured to communicate wirelessly with the remote control via radio signals, Wi-Fi, cellular data signals, and/or any other wireless communication protocols or techniques known in the art. In some embodiments of the invention, the remote communication element 26 may be configured to wirelessly communicate with a mobile device and/or the remote control 36 described herein. Additionally or alternatively, the remote communication element 26 may be configured to wirelessly communicate with one or more routers or servers to allow interfacing of the system 10 components via various websites, mobile apps, and other interne or cloud-based computer programs accessible via the remote control 36.

The operational elements 28 controlling the plurality of operations of the system 12 may include various circuits, actuators, and/or sensors. For example, the operational elements 28 may comprise a transformer 46 or other power source, forward and reverse contactors 48, pump circuits 50, and various sensors 52, such as pressure sensors, flow meters, rain buckets, rain gages, temperature probes, and the like. Furthermore, the sensors 52 may include one pressure sensor at the pivot point 20 and another pressure sensor at a far end of the system 12, opposite the pivot point 20. Each of these operational elements 28 may be electrically and/or communicably coupled with the local controller 24.

The transformer 46 or other power source may provide electrical power to various system 10 elements. For example, the transformer 46 or power source may be directly or indirectly coupled with the other operational elements 28, the local controller 24, the relay 30, the alignment circuit 14, the user interface 32, and/or the display elements 34. The power source may comprise conventional power supply elements such as batteries, battery packs, etc. The power source may also comprise the transformer 46, power conduits, connectors, and/or receptacles operable to receive batteries, battery connectors, or power cables.

The alignment circuit 14 may electrically couple the operational elements 28 and the local controller 24. The alignment circuit 14 may include any variety of sensors and circuits known in the art for indicating when one or more of the towers 16 or spans 18 are out of alignment with each other. For example, if one of the towers 16 gets stuck in mud or has an obstacle preventing it from forward motion, it may experience misalignment with the other towers 16 of the system 12. The alignment circuit 14, sometimes referred to as a safety circuit, may include any alignment fault detection systems known in the art, such as those described in U.S. Pat. Nos. 8,763,937; 3,952,769; and 6,254,018, incorporated by reference herein in their entirety. In some embodiments of the invention, the alignment circuit 14 may be configured to switch between a closed circuit configuration when the towers 16 are in proper alignment and an open circuit configuration when one or more of the towers 16 are misaligned beyond a threshold limit. That is, when misalignment occurs, the alignment circuit 14 in the open circuit configuration no longer allows electrical signals to pass therethough. This is a safety feature to protect the equipment of the system 12, such as when one or more of the towers 16 is stuck.

The relay 30 may be any electrically-operated switch known in the art. The relay 30 may comprise an electromagnet to mechanically operate a switch or may be a solid-state relay. The relay 30 may be electrically coupled to the local controller 24, the alignment circuit 14, one or more of the operational elements 28 such as the forward and reverse contactors 48, and/or the user interface 32. For example, the local controller 24 and/or the user interface 32 may be configured to provide switching signals to the relay 30. Furthermore, outputs of the relay 30 may be electrically coupled to the alignment circuit 14 and the operational elements 28 such as the forward and reverse contactors 48. In one embodiment of the invention, the relay 30 is configured to switch between an open circuit configuration in which no signal may pass therethrough and a closed circuit configuration in which signal is allowed to pass therethrough. In this embodiment of the invention, the relay 30 may be electrically coupled between the local controller 24 and the operation elements 28 (e.g., the forward and reverse contactors 48).

The user interface 32 may permit a user to operate the system 10 and enables users, third parties, or other devices to share information with the system 10. The user interface 32 may comprise one or more functionable inputs such as buttons, switches, scroll wheels, a touch screen associated with the display, voice recognition elements such as a microphone, pointing devices such as mice, touchpads, tracking balls, styluses, a camera such as a digital or film still or video camera, combinations thereof, etc. Further, the user interface 32 may comprise wired or wireless data transfer elements such as removable memory, data transceivers, etc., to enable the user and other devices or parties to remotely interface with the system 10 and/or the local controller 24. The user interface 32 may also include a speaker for providing audible instructions and feedback.

Figure 3:
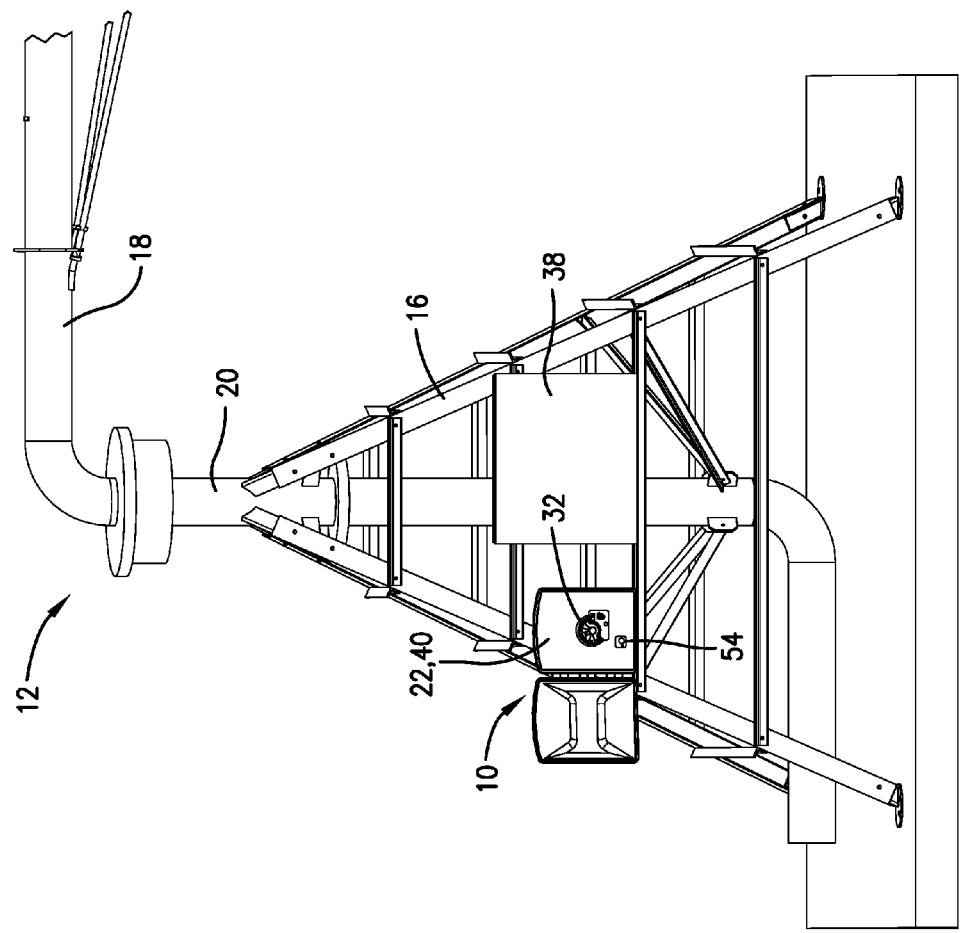
FIG. 3 is a front elevation view of a housing and a user interface of the system of FIG. 1 mounted on a pivoting point of the electric center pivot irrigation system.
Figure 4:
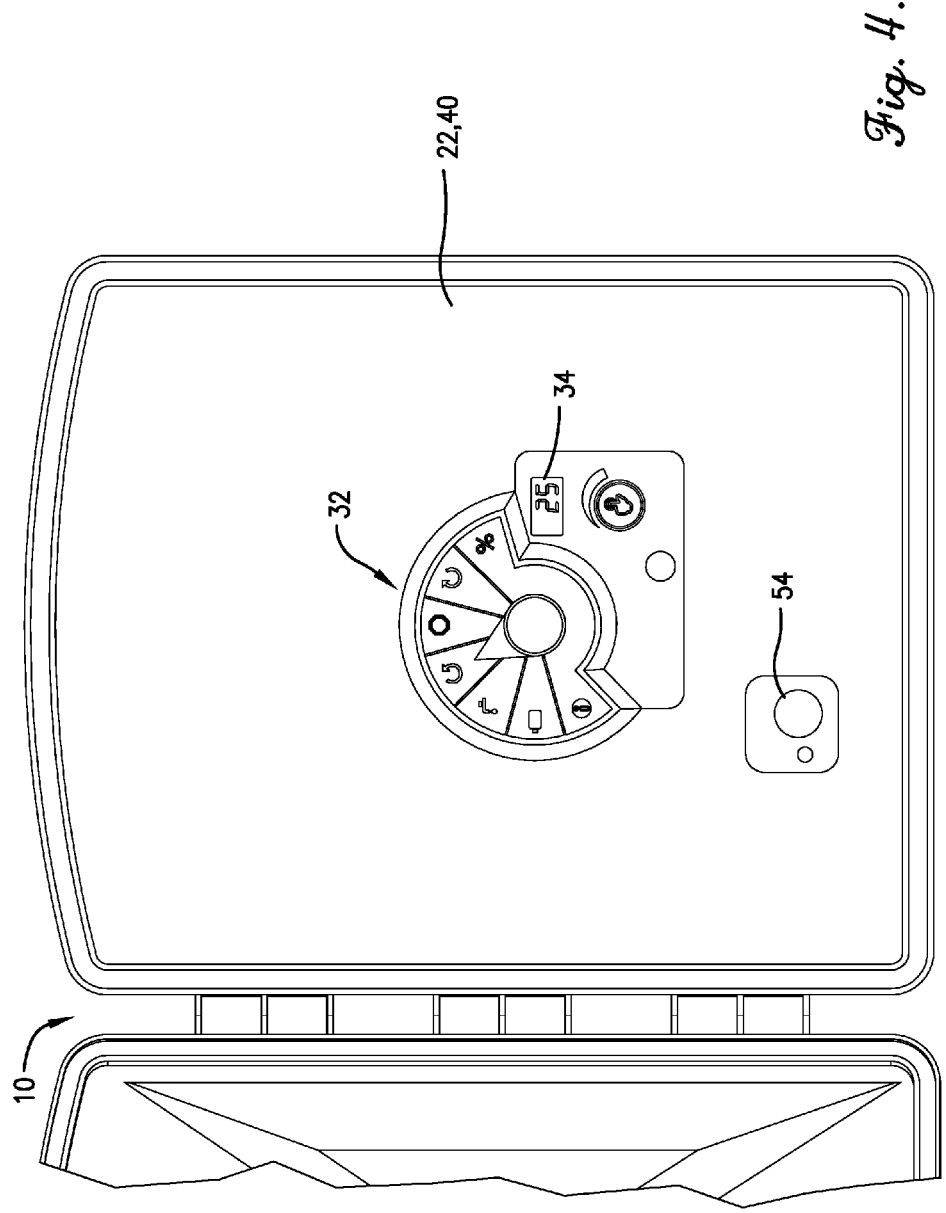
FIG. 4 is a front elevation view of the user interface of the system of FIG. 3.

In some embodiments of the invention, the user interface 32 may comprise an override interface 54, as illustrated in FIGS. 3 and 4, such as an override switch, button, or knob which mechanically and/or electrically switches the relay and/or temporarily places the alignment circuit into a closed circuit configuration. For example, an override button may be held by a user and may temporarily place the alignment circuit 14 into the closed circuit configuration until released by the user. Alternatively, the override interface 54 may switch the relay 30 to bypass the alignment circuit 14 temporarily.

The display elements 34 may include a display screen, lights, and any other visual display devices known in the art. Specifically, the display elements 34 may comprise a graphical interface operable to display light, visual graphics, images, text, etc. in response to external or internal processes and commands. For example, the display elements 34 may comprise conventional black and white, monochrome, or color display elements including CRT, TFT, LCD, and/or LED display devices. The display elements 34 may be integrated with the user interface 32, such as in embodiments where the display elements 34 include a touch screen display to enable the user to interact with it by touching or pointing at display areas to provide information or selections to the local controller 24. The display elements 34 may be coupled with or integral with the local controller 24 and may be operable to display various information corresponding to travel speed, travel direction, warning signals, alignment fault alerts, selected threshold values, water pressure, water temperature, various sensor readings, etc.

The remote control 36 may be a mobile phone, a smart phone, a tablet computer, a laptop computer, a desktop computer, and the like. For example, the remote control 36 may comprise a processor, wires, circuits, receivers, transmitters, transceivers, memory storage devices, user interfaces, display screens, and the like. In some embodiments of the invention, the remote control 36 may be a custom remote control designed to specifically operate with the other elements of the system 10, in accordance with methods described herein. However, in other embodiments of the invention, the remote control 36 may be any of the personal electronic devices described above and may include or be communicably coupled with a computer readable medium comprising a computer program executable thereby to perform one or more of the method steps described herein.

The user interface and/or the display screens of the remote control 36 may have similar or identical characteristics to the user interface 32 and the display elements 34 described above and known in the art. Computer programs and computer-readable mediums, as stored on either the remote control 36 or the local controller 24, are generally defined above. One or more of the method steps described herein may require execution of computer code stored on the local controller 24 and/or execution of computer code stored locally on the remote control 36. Furthermore, one or more of the code segments or method steps described herein may be accessed remotely from a server, website, or other cloud-based storage devices.

In use, the remote control 36 may receive an alignment fault alert from the local controller 24, via the remote communication element 26, indicating that the alignment circuit 14 has switched to the open circuit configuration. Then the remote control 36 may send an auto-alignment signal from the remote control 36 to the local controller 24, via the remote communication element 26, instructing the local controller 24 to command the relay 30 to switch to a mode in which signals between the operational elements 28 and the local controller 24 bypass the alignment circuit 14 and to command the operational elements 28 to reverse travel directions of the electric center pivot irrigation system 12.

Figure 5:
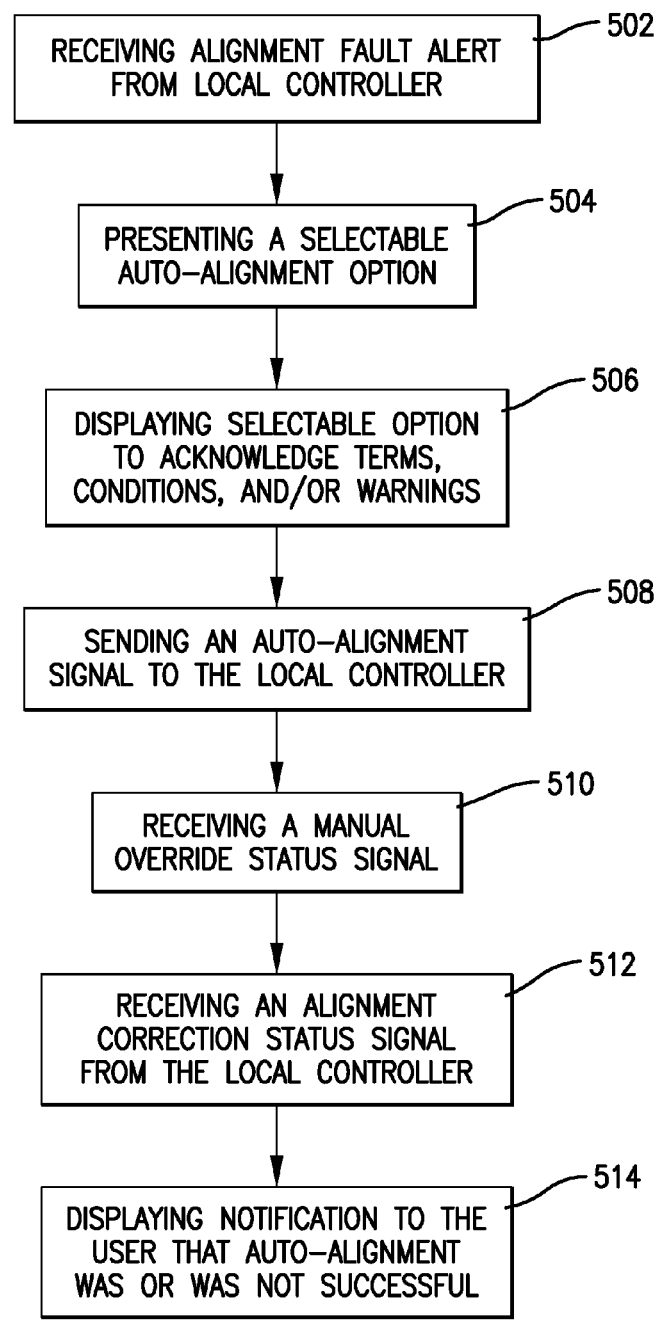
FIG. 5 is a flowchart illustrating steps involved in a method for remotely overriding an alignment circuit of the electric center pivot irrigation system in accordance with embodiments of the present invention.

Method steps for controlling the electric center pivot irrigation system 12 will now be described in more detail, in accordance with various embodiments of the present invention. The steps of the method 500 may be performed in the order as shown in FIG. 5, or they may be performed in a different order. Furthermore, some steps may be performed concurrently as opposed to sequentially. In addition, some steps may not be performed. One or more of the steps herein may represent computer code or code segments of the type described above.

The method 500 illustrated in FIG. 5 may include a step of receiving an alignment fault alert from the local controller 24, as depicted in block 502. The alignment fault alert may be any alert, communicated electrically, visually, or audibly, for indicating that the alignment circuit 14 has switched from the closed circuit configuration to the open circuit configuration. For example, the remote control 36 may receive the alignment fault alert provided from the local controller 24 and transmitted via the remote communication element 26. Additionally or alternatively, the display elements 34 located at the pivot point 20 may receive alignment fault alert information from the local controller 24 and/or the alignment circuit 14.

Then the method 500 may include the steps of presenting on the remote control 36 (via a display screen or the like) an option to select auto-alignment in response to receiving the alignment fault alert, as depicted in block 504, and/or displaying on the remote control 36 (via the display screen or the like) terms, conditions, and/or warnings to be acknowledged by the user (via user selection or the like), as depicted in block 506. In some embodiments of the invention, these steps may include granting and/or receiving privileges to enable auto-alignment features as part of the user's login credentials. In some embodiments of the invention, only admins, dealers, or those indicated as "super users" can grant access to a user. In some embodiments of the invention, this feature may only be enabled if purchased independently or as a bundle along with a specific pivot control product.

Next, the method 500 may include a step of sending an auto-alignment signal to the local controller 24, as depicted in block 508. The remote control 36 may automatically, or in response to user manipulation of the remote control's user interface, send the auto-alignment signal to the local controller 24 via the remote communication element 26. For example, the auto-alignment signal may be sent in response to selection of the option for auto-alignment by the user via the user interface of the remote control 36 and/or in response to selections acknowledging the terms, conditions, and/or warnings displayed on the display screen of the remote control 36, as noted above. For example, as a safety precaution, the user may be required to acknowledge and/or accept certain terms and conditions before the auto-alignment signal may be sent, thereby indicating the user has identified the fault reason. The acknowledgement and acceptance of these terms and conditions may be logged along with a time and date, pivot position, and user.

The auto-alignment signal may be a signal instructing the local controller 24 to command the relay 30 to switch from a normal mode to a bypass mode in which signals between the operational elements 28 and the local controller 24 bypass the alignment circuit 14. Additionally, the auto-alignment signal may command one of the operational elements 28 (such as the forward and reverse contactors 48) to reverse travel directions of the electric center pivot irrigation system 12 in a direction opposite a current direction of travel. Note that in the normal mode, electric or communication signals pass to the alignment circuit 14 and are then routed on to the other operational elements 28 when the alignment circuit 14 is in the closed circuit configuration. When the alignment circuit 14 is forced into the open circuit configuration due to tower misalignment, but the relay is still in the normal mode, electrical or communication signals being sent to the alignment circuit 14 stop there and are not able to continue through to the other operational elements 28. When the alignment circuit 14 is in the open circuit configuration and the relay 30 is in the bypass mode, signals fed into the relay 30 from the local controller 24 are now provided with a pathway directly to the other operational elements 28, without routing through the alignment circuit 14.

The step 508 of sending the auto-alignment signal may additionally or alternatively be performed locally via an automated response by the local controller 24 without requiring instructions from the remote controller 36 or may be performed by the local controller 24 receiving an auto-alignment selection made by the user via the user interface 32 at the pivot point 20. In yet another alternative embodiment of the invention, the step 508 may be replaced with a step of manual alignment correction performed by the user via the user interface 32 at the pivot point 20. The override interface 54 described above may mechanically and/or electrically switch the relay 30 and/or otherwise temporarily places the alignment circuit 14 into the closed circuit configuration. For example, the override button may be held by a user and may temporarily place the alignment circuit 14 into the closed circuit configuration until released by the user. Alternatively, the override interface 54 may switch the relay 30 to bypass the alignment circuit 14 temporarily. During this manual temporary alignment, the forward and reverse contactors 48 may be operated to move the pivot towers 16 forward and backwards until no longer out of alignment. That is, if the alignment fault alert is no longer being displayed, the user may assume that the towers 16 are back into alignment and the system 12 may be allowed to continue in its original travel direction.

In embodiments of the invention where manual override of the alignment circuit 14 may occur, the method 500 may further comprise a step receiving a manual override status signal indicating that the alignment circuit 14 is being bypassed via actuation of the pivot's user interface 32 or the override interface 54, as depicted in block 510. Specifically, the local controller 24 may send the manual override status signal, via the remote communication element 26, to the remote control 36. Upon receiving this manual override status signal, the remote control 36 may be configured to indicate this information to the user on the display screen thereof and/or to cease providing any auto-alignment options to the user, such as those previously provided in blocks 504 and 506. This may prevent a remote user from attempting auto-alignment via the remote control 36 while a user at the pivot point 20 is simultaneously manually trying to fix the pivot's alignment issues.

In some embodiments of the invention, the auto-alignment signal may switch the relay 30 to bypass the alignment circuit 14 for only a threshold number of occurrences. For example, the relay 30 may stop switching into and out of its bypass mode after doing so the threshold number of times (e.g. three times). Additionally or alternatively, the auto-alignment signal may switch the relay 30 to bypass the alignment circuit 14 for only a threshold amount of time. For example, the relay 30 may be switched to the bypass mode for a threshold number of minutes before switching back to the normal mode. In some embodiments of the invention, in response to the auto-alignment signal, the operational elements 28 may be additionally or alternatively commanded to reverse travel directions of the electric center pivot irrigation system 12 a threshold number of occurrences and/or a threshold amount of time.

The method 500 may also comprise a step of receiving a status signal from the local controller 24 between occurrences of the relay 30 being switched to the bypass mode, as depicted in block 512, or whenever the relay 30 is switched from the bypass mode back to the normal mode. The status signal may indicate whether or not the alignment circuit 14 has switched to the closed circuit configuration and thus the towers 16 are back in alignment. For example, the local controller 24 may conduct some test or check each time the relay 30 is switched back into its normal mode to determine if the alignment circuit 14 is back into the closed circuit configuration.

The method 500 may comprise a step of notifying the user that auto-alignment was or was not successful, as depicted in block 514. For example, if the alignment circuit 14 does not revert back to the closed circuit configuration in the threshold number of occurrences or in the threshold amount of time described above, the display screen of the remote control 36 may present an indication that auto-alignment was not successful. This may, therefore, require manual alignment corrections of the electric center pivot irrigation system 12 by the user to continue operation thereof. Failure of auto-alignment efforts may be determined based on the status signals received by the remote control in step 512, and the notifying step 514 may be accomplished via audible or visual notifications, such as instructing the display screen of the remote control 36 to indicate this failure to the user thereon with text, images, or the like.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A method for controlling an electric center pivot irrigation system having a plurality of towers attached to each other by a plurality of spans, wherein the electric center pivot irrigation system is controlled by a control system including a local controller, a remote communication element, operational elements controlling a plurality of operations, an alignment circuit electrically coupling the operational elements and the local controller, and a relay, wherein the alignment circuit is configured to switch to an open circuit configuration when one or more of the towers are out of alignment and to switch to a closed circuit configuration when all of the towers are back in alignment with each other, the method comprising:

receiving with a remote control an alignment fault alert from the local controller, via the remote communication element, indicating that the alignment circuit has switched to the open circuit configuration; and sending an auto-alignment signal from the remote control to the local controller, via the remote communication element, instructing the local controller to command the relay to switch to a bypass mode in which signals between the operational elements and the local controller bypass the alignment circuit and to command the operational elements to reverse travel directions of the electric center pivot irrigation system.

2. The method of claim 1, wherein the relay is switched to bypass the alignment circuit for at least one of a threshold number of occurrences and a threshold amount of time.

3. The method of claim 1, wherein the operational elements are commanded to reverse travel directions of the electric center pivot irrigation system for at least one of a threshold number of occurrences and a threshold amount of time.

4. The method of claim 1 further comprising: receiving a status signal from the local controller between each of a plurality of occurrences of the relay being switched to bypass the alignment circuit, wherein the status signal indicates whether or not the alignment circuit has switched to the closed circuit configuration and the towers are back in alignment.

5. The method of claim 1, wherein the operational elements comprise a transformer and forward and reverse contactors, and the auto-alignment signal instructs the local controller to command the forward and reverse contactors to reverse the electric center pivot irrigation system in a direction opposite a current direction of travel.

6. The method of claim 1, further comprising a step of presenting on a display screen of the remote control an option to select auto-alignment in response to receiving the alignment fault alert, wherein the auto-alignment signal is sent in response to selection of the option for auto-alignment by a user via a user interface of the remote control.

7. The method of claim 6, further comprising a step of displaying on the display screen at least one of terms, conditions, and warnings to be acknowledged by the user prior to sending the auto-alignment signal.

8. The method of claim 1, wherein the remote control is at least one of a mobile phone, a tablet computer, a laptop computer, and a desktop computer.

9. The method of claim 1, further comprising a step of receiving with the remote control a manual override status signal indicating that the alignment circuit is being bypassed via actuation of a pivot user interface electrically coupled to the alignment circuit and the local controller.

10. A physical, non-transitory computer readable medium comprising a computer program stored thereon for controlling an electric center pivot irrigation system having a plurality of towers attached to each other by a plurality of spans, wherein the electric center pivot irrigation system is controlled by a control system including a local controller, a remote communication element, operational elements controlling a plurality of operations, an alignment circuit electrically coupling the operational elements and the local controller, and a relay, wherein the alignment circuit is configured to switch to an open circuit configuration when one or more of the towers are out of alignment and to switch to a closed circuit configuration when all of the towers are back in alignment with each other, the computer program comprising:

a code segment for receiving with a remote control an alignment fault alert from the local controller, via the remote communication element, indicating that the alignment circuit has switched to the open circuit configuration; and a code segment for sending an auto-alignment signal from the remote control to the local controller, via the remote communication element, instructing the local controller to command the relay to switch to a bypass mode in which signals between the operational elements and the local controller bypass the alignment circuit and to command the operational elements to reverse travel directions of the electric center pivot irrigation system.

11. The computer-readable medium of claim 10, wherein the relay is switched to bypass the alignment circuit for at least one of a threshold number of occurrences and a threshold amount of time.

12. The computer-readable medium of claim 10, wherein the operational elements are commanded to reverse travel directions of the electric center pivot irrigation system for at least one of a threshold number of occurrences and a threshold amount of time.

13. The computer-readable medium of claim 10, further comprising: a code segment for receiving a status signal from the local controller between each of a plurality of occurrences of the relay being switched to bypass the alignment circuit, wherein the status signal indicates whether or not the alignment circuit has switched to the closed circuit configuration and the towers are back in alignment.

14. The computer-readable medium of claim 10, wherein the operational elements comprise a transformer and forward and reverse contactors, and the auto-alignment signal instructs the local controller to command the forward and reverse contactors to reverse the electric center pivot irrigation system in a direction opposite a current direction of travel.

15. The computer-readable medium of claim 10, further comprising a code segment for presenting on a display screen of the remote control an option to select auto-alignment in response to receiving the alignment fault alert, wherein the auto-alignment signal is sent in response to selection of the option for auto-alignment by a user via a user interface of the remote control.

16. The computer-readable medium of claim 15, further comprising a code segment for displaying on the display screen at least one of terms, conditions, and warnings to be acknowledged by the user prior to sending the auto-alignment signal.

17. The computer-readable medium of claim 10, wherein the remote control is at least one of a mobile phone, a tablet computer, a laptop computer, and a desktop computer.

18. The computer-readable medium of claim 10, further comprising a code segment for receiving with the remote control a manual override status signal indicating that the alignment circuit is being bypassed via actuation of a pivot user interface electrically coupled to the alignment circuit and the local controller.

19. A system for controlling an electric center pivot irrigation system having a plurality of towers attached to each other by a plurality of spans, wherein the electric center pivot irrigation system includes an original control system having an original control logic, operational elements controlling a plurality of operations, and an alignment circuit, wherein the alignment circuit is configured to switch to an open circuit configuration when one or more of the towers are out of alignment and to switch to a closed circuit configuration when all of the towers are back in alignment with each other, the system comprising:

a local controller configured to be communicably coupled with at least one of the operational elements of the electric center pivot irrigation system, the local controller being installed at a pivoting point of the electric center pivot irrigation system and bypassing the original control logic of the original control system;

a user interface communicably coupled with the local controller and configured to receive selections from a user and communicate the selections to the local controller;

a remote communication element configured receive data from a remote control according to selections made by the user remotely controlling the plurality of operations of the electric center pivot irrigation system, the remote communication element being configured for installation at the pivoting point of the electric center pivot irrigation system, and being functionally integrated with the local controller such that a change made via the remote communication element is reflected in the local controller; and a relay configured to electrically couple the alignment circuit with at least one of the local controller and the operational elements, wherein the local controller is configured to, in response to detecting that the alignment circuit has switched to the open circuit configuration, send an alignment fault alert to the remote control via the remote communication element, wherein the local controller, in response to receiving an auto-alignment signal from the remote control via the remote communication element, is configured to switch the relay to a bypass mode in which signals between the operational elements and the local controller bypass the alignment circuit and to command the operational elements to reverse travel directions of the electric center pivot irrigation system, wherein the local controller is configured to place the relay in the bypass mode for at least one of a threshold number of occurrences and a threshold amount of time.

20. The system of claim 19, wherein the local controller is configured to determine if the alignment circuit has switched to the closed circuit configuration between each of the occurrences of the relay being switched to bypass the alignment and to output a notification of success to the remote control via the remote communication element if the alignment circuit is determined to again be in the closed circuit configuration.

\* \* \* \* \*